United States Patent [19]

Bedard

[11] 4,163,425
[45] Aug. 7, 1979

[54] LOAD ANCHORING SYSTEMS FOR FLATBED

[76] Inventor: Victor Bédard, 40 Van Vliet St., Lacolle, Canada, J0J 1J0

[21] Appl. No.: 847,218

[22] Filed: Oct. 31, 1977

[51] Int. Cl.² .................. B61D 17/00; B61D 45/00
[52] U.S. Cl. .............................. 105/366 C; 105/465
[58] Field of Search ........... 105/366 A, 366 B, 366 C, 105/366 D, 366 E, 366 R, 463, 464, 465

[56] References Cited

U.S. PATENT DOCUMENTS

| | | | |
|---|---|---|---|
| 2,021,503 | 11/1935 | Fields | 105/366 R |
| 3,224,383 | 12/1965 | Gutridge et al. | 105/366 R |
| 3,438,671 | 4/1969 | Seng | 105/366 B |
| 3,683,463 | 8/1972 | Sieter et al. | 105/366 B |
| 3,701,562 | 10/1972 | Carr | 105/366 B |
| 3,827,375 | 8/1974 | Terlecky et al. | 105/366 D |
| 4,023,504 | 5/1977 | Grey | 105/366 A |

*Primary Examiner*—Albert J. Makay
*Assistant Examiner*—Edmond G. Rishell, Jr.

[57] ABSTRACT

Systems for anchoring a load or container on a flatbed and particularly adapted to be used with existing containers without alteration thereto and which systems are simple and readily and safely anchor a container on a flatbed. Such load anchoring system comprises a beam secured on the flatbed, a slideway formed in the beam, an anchoring member slidable in the slideway and having a prong engageable endwise into an aperture in the corner post of a container, and a lever pivoted relative to the prong to register with the anchoring member in the path of displacement thereof to block the prong against retraction from the aperture in the corner post.

6 Claims, 9 Drawing Figures

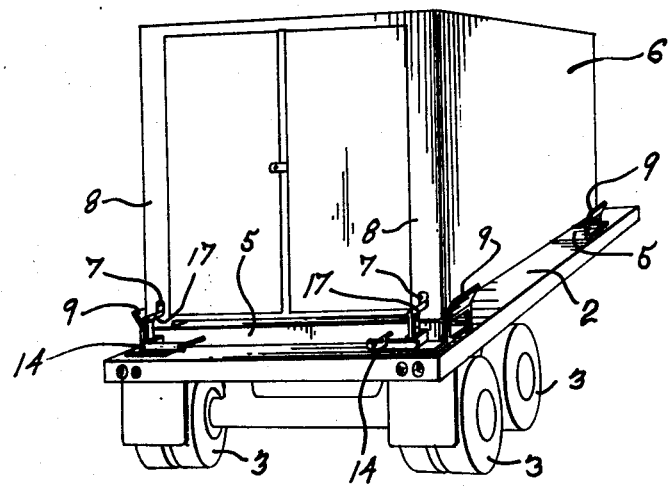
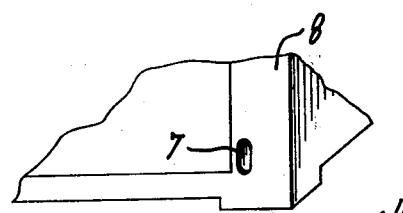
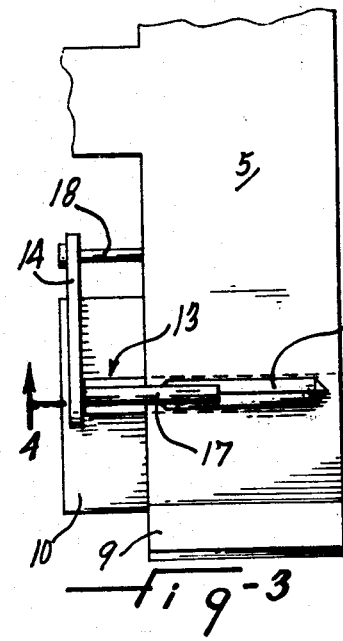
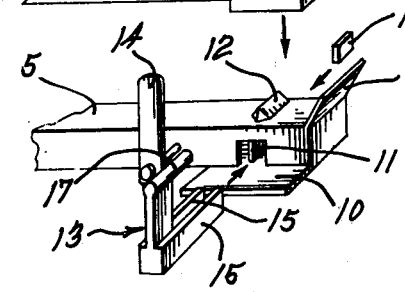
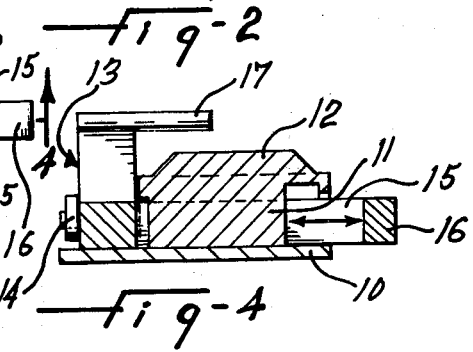

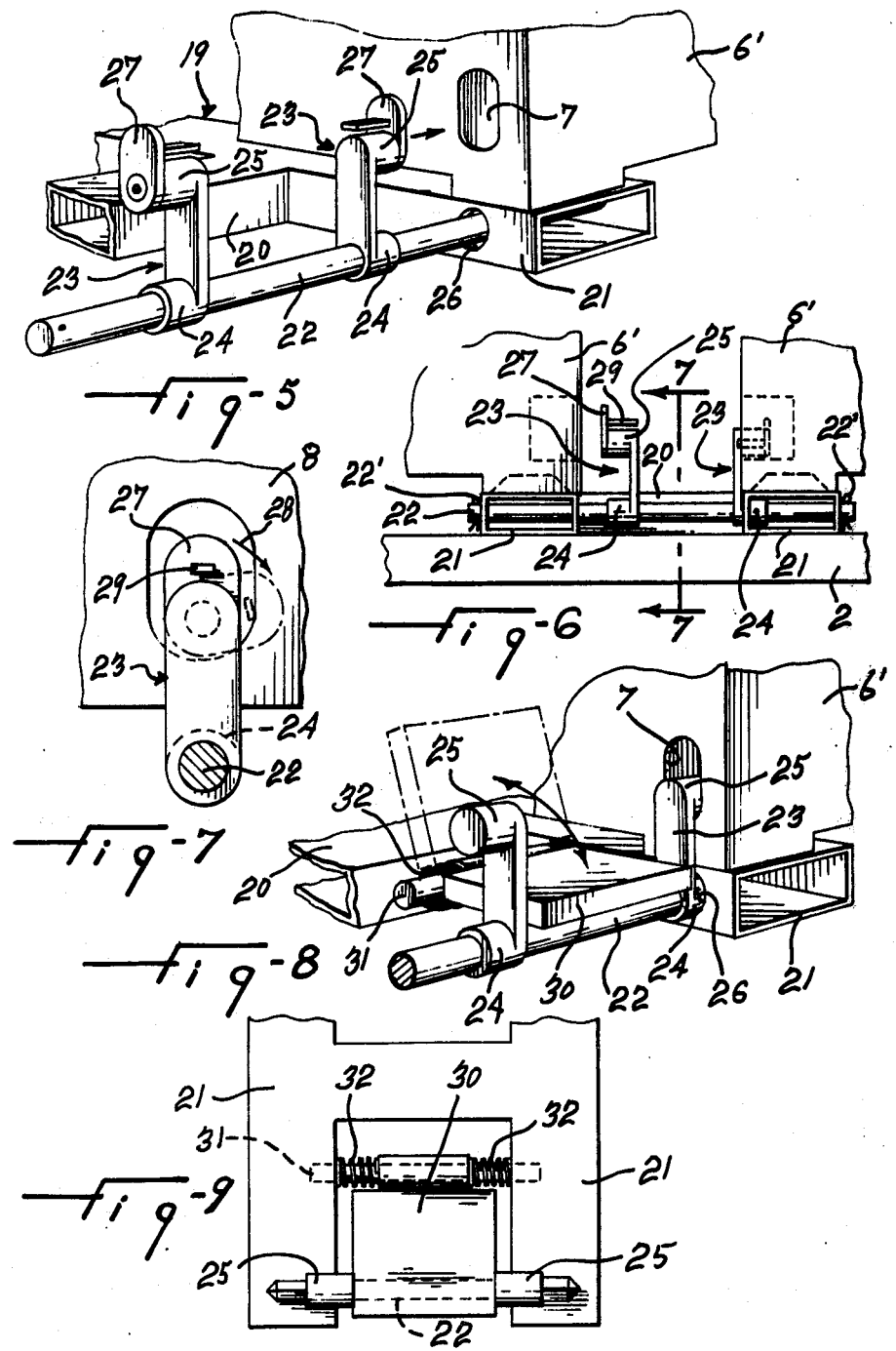

LOAD ANCHORING SYSTEMS FOR FLATBED

This invention relates to systems adapted to anchor a load on a flatbed, and more particularly, to load anchoring systems of the type adapted to anchor a container on a flatbed.

Chains are sometimes used to secure containers on flatbeds. This is not considered practical and satisfactory due to the time taken to manipulate the chains and to the encumbrance and weight of the chains. There has also been previously proposed a container coupling mechanism but the latter disadvantageously requires special construction of the containers to attach such coupling mechanism thereto.

It is a general object of the present invention to provide a load or container anchoring system which substantially avoids the above mentioned disadvantages.

It is an object of the present invention to provide a load or container anchoring system which is adapted to be used with existing containers without alteration thereof or modification thereto.

It is another object of the present invention to provide a load or container anchoring system which is simple and easy to operate and readily and safely anchors a container or load on a flatbed.

The above and other objects and advantages of the present invention will be better understood with reference to the following detailed description of preferred embodiments thereof which are illustrated, by way of examples, in the accompanying drawings, in which:

FIG. 1 is a perspective view of the flatbed of a truck with a container anchored thereon with a load anchoring system according to one embodiment of the present invention;

FIG. 2 is a detailed perspective view illustrating the assembly of the anchoring system at the right and rear corner post of the container in FIG. 1;

FIG. 3 is a top view of the portion of the anchoring system shown in FIG. 2 shown in blocked position;

FIG. 4 is a cross-sectional view as seen along line 4—4 in FIG. 3;

FIG. 5 is a perspective view of a portion of an anchoring system according to another embodiment of the present invention adapted to anchor two adjacent containers to a flatbed;

FIG. 6 is a side view of the portion of the anchoring system shown in FIG. 5 in association with a pair of adjacent containers;

FIG. 7 is a cross-sectional view as along line 7—7 in FIG. 6 illustrating the manner of blocking the corresponding anchoring system in operative position;

FIG. 8 is a perspective view of a portion of an anchoring system according to still another embodiment of the present invention to anchor two adjacent containers on a flatbed; and FIG. 9 is a top plan view of the portion of the anchoring system shown in FIG. 8.

The load anchoring system illustrated in FIGS. 1 to 4 inclusive comprises a pair of spaced beams 5 secured flat on the flatbed 2 of a truck indicated by the roadwheels 3. The beams 5 operatively extend across the flatbed 2 and spaced-apart a distance substantially equal to the length of a standard container 6 to support the ends of the latter. Each beam 5 is of box shape or square cross-section.

The anchoring systems according to the present invention are adapted to be used with standard containers 6 which have an aperture 7 in each corner post 8 thereof.

On each end of the transverse beams 5 there is secured a guide plate 9 which is inclined downwardly inward to properly position the container transversely relative to the flatbed. Thus, the apertures 7 are positioned in predetermined position transversely of the flatbed. A baseplate 10 is rigidly secured at each end of the transverse beams 5 and to the latter. An aperture extends through each end of the beams 5 and a plate 11 is fixed edgewise upright inside and in alignment with each aperture to cooperatively form a slideway in the corresponding aperture. Such slideway is substantially parallel to the flatbed 2 and transversely extends through the outer end of corresponding transverse beam 5. Thus, each such slideway extends longitudinally of the flatbed. Right above each slideway there is provided a boss 12 which is adapted and arranged to fit in the bottom of a corner post 8 and to thus positively locate the corner of the container in vertical register with the outer end of the beam 5.

For each corner post 8 or end of the beam 5 the anchoring system of FIGS. 1 to 4 inclusive includes an anchoring member 13 and a corresponding lever 14. The anchoring member 13 has a lower portion forming a slide slidably engaged in the slideway of the corresponding end of a beam 5. This slide is formed by a pair of parallel bars 15 engaged on opposite sides respectively of the corresponding plate 11 and so retained by a block 16 welded between the free ends of the bars. The latters are of sufficient length to allow sliding of the anchoring member 13 transversely of the beam 5 and to and fro relative to the corresponding container and in a plane substantially parallel to flatbed 2. The anchoring member 13 includes a prong 17 which projects endwise toward the corresponding corner post 8 to engage in the aperture 7 thereof and thus anchor the container on the flatbed. The lever 14 is freely pivoted at one end on a pin 18 fixedly secured to the corresponding beam 5. The lever 14 thus freely pivots transversely relative to the path of displacement to intercept the anchoring member 13 and outwardly register therewith, shown in FIGS. 1, 3, and 4, to block the anchoring member 13 against outward retraction of the prong 17 from the corresponding aperture 7. The weight of the lever 14 simply holds the latter against accidental release of the anchoring member 13.

As may be seen from FIG. 1, the anchoring system in this embodiment includes an anchoring member 13 and a lever 14 at each of the four ends defined by the two transverse beams 5 to anchor the container at each corner post thereof.

The container or load anchoring system of FIGS. 5, 6, and 7 includes a beam assembly 19 is consisting of a pair of spaced transverse beams 21 united together near each of their two ends by a longitudinal link 20. Apertures are provided through the ends of the transverse beams 21. A rod 22 extends into the apertures through one end of the beams 21 along each side of the flatbed and is retained by cotter pins 22'. The rod 22 forms a slideway extending between a pair of adjacent containers 6' and endwise relative to the latter. The containers 6' have half the length of containers 6.

A pair of anchoring members 23 are slidably mounted on the rod 22 and include each a sleeve portion 24 and a prong 25 projecting on the same side toward the corresponding container 6'. The sleeve portion 24 is adapted to engage in the annular space 26 defined around the rod 22 in the corresponding end of the beam 21. The prong 25 engages endwise in the aperture 7 until abutment of the anchoring member 23 against the corresponding beam 21.

A lever 27 is pivoted on the prong 25 of each anchoring member 23 and arranged to engage in the aperture 7 and be pivoted in the latter transversely of the prong. This is shown by the arrow 28 and the dotted line position of this lever 27 is FIG. 7. This lever 27 thus blocks the anchoring member 23 in anchoring position against retraction from the corresponding corner post 8. A lug 29 is fixed to each lever 27 and outwardly project to limit the pivoting of the latter and to provide a grip to pivot the lever for withdrawal thereof from the aperture 7.

The anchoring system illustrated in FIGS. 8 and 9 like the system of FIGS. 5,6, and 7 includes the beam assembly 19, the link 20, the transverse beam 21, the rod 22, the pair of anchoring members 23 on each rod 22, a sleeve portion 24 and a prong 25 on each anchoring member 23, and an annular space 26 in each end of the beam 21 around the rod 22.

In this embodiment of FIGS. 8 and 9, the prongs 25 are distinctively blocked in anchoring position by a plate 30 pivoted on a pin 31 extending parallel to the rod 22 and secured at its opposite ends in the beams 21 respectively. A pair of springs 32 are engaged around the pin 31 on the opposite sides of the plate 30 to axially center the latter relative to the beams 21 and thus to the two adjacent container. The prongs 25 in this case are blocked in anchoring position by engagement of the pivoted plate 30 between the corresponding anchoring members 23.

It must be noted that many changes in the details of construction are possible and fall within the spirit and principle of the present invention as defined by the appended claims.

What I claim is:

1. A system for anchoring an elongated container in transport position longitudinally of a flat bed vehicle, said container being of the type having a recess, or aperture, made in the lower end of each corner thereof and opening at the end faces of said container, said system comprising beams secured to said flat bed transversely thereof and spaced apart longitudinally of said flat bed a distance substantially equal to the length of said container for supporting said container off said flat bed at the four corners thereof, means to positively locate the four corners of said container in vertical register with the outer ends of said beams, a slideway carried by said beams at each outer end thereof, each slideway extending through and transversely of the associated beam and being substantially parallel to the flat bed of the vehicle, an anchor member for each slideway, said anchor member having a slide portion slidable along the associated slideway for slidable movement in a direction substantially parallel to said flat bed and towards and away from the corresponding end face of said container between a container-anchoring position and a container-releasing position, respectively, a prong carried by said anchor member and facing said container end face and engaging said recess in said container-anchoring position of said anchor member and clearing said recess in said container-releasing position of said anchor member, and a locking lever associated with each anchor member freely pivotally mounted at one end about an axis extending longitudinally of said flat bed for pivotal movement in a plane transverse to the direction of slidable movement of said anchor member, to take under gravity an operative limit position, locking said anchor member in said container-anchoring position.

2. A system as claimed in claim 1, wherein said locking lever is pivotally mounted on a pin, itself secured to said beam.

3. A system as claimed in claim 1, wherein said locking lever is pivotally connected directly to said prong and extends beyond the same to engage under gravity an inner surface in said recess.

4. A system as claimed in claim 1, wherein said slideway is formed by a passage extending through the end of the beam and opening at the opposite sides thereof and by a plate secured to said beam and extending vertically in the center of said passage and said slide portion of said anchor member includes a rectangular frame slidable within said passage with said plate extending within said frame, said anchor member rigidly upstanding from an end of said frame and said prong rigidly fixed to the upper end of said anchor member and extending towards said beam.

5. A system as claimed in claim 1, wherein said slideway consists of a rod member secured to the outer end of said beam transversely of said beam and extending therefrom in a direction away from the end face of said container, and said slide portion of said anchoring member consists of a sleeve surrounding said rod member and slidable thereon.

6. A system as claimed in claim 5, further including an additional beam secured to said flat bed transversely thereof and located close to one of said first-named beams for receiving the end corners of an additional container located longitudinally of said flat bed with one end face close to, but spaced from, the adjacent end face of the first-named container, said additional beam having means to positively locate the corners of the adjacent additional container in vertical register with the outer ends of said additional beam, said rod member extending across the two closely adjacent beams, there being two anchor members, each having a slide portion slidable on the same rod member and each having a prong upstanding towards the recess of the corner leg of the respective containers and said locking lever constitutes a plate pivotally connected to said beams and having a width substantially equal to the distance separating the two anchor members in their respective container-anchoring positions, said plate taking under gravity a locking position extending between the two anchor members, and further including spring means axially biasing said plate in centered relationship relative to said two anchor members when in their container-anchoring positions.

* * * * *